Nov. 30, 1965 R. MEADOWCROFT 3,220,779
METHOD AND APPARATUS FOR CONVEYING PARTICULATE MATERIAL
Filed April 24, 1963 2 Sheets-Sheet 1
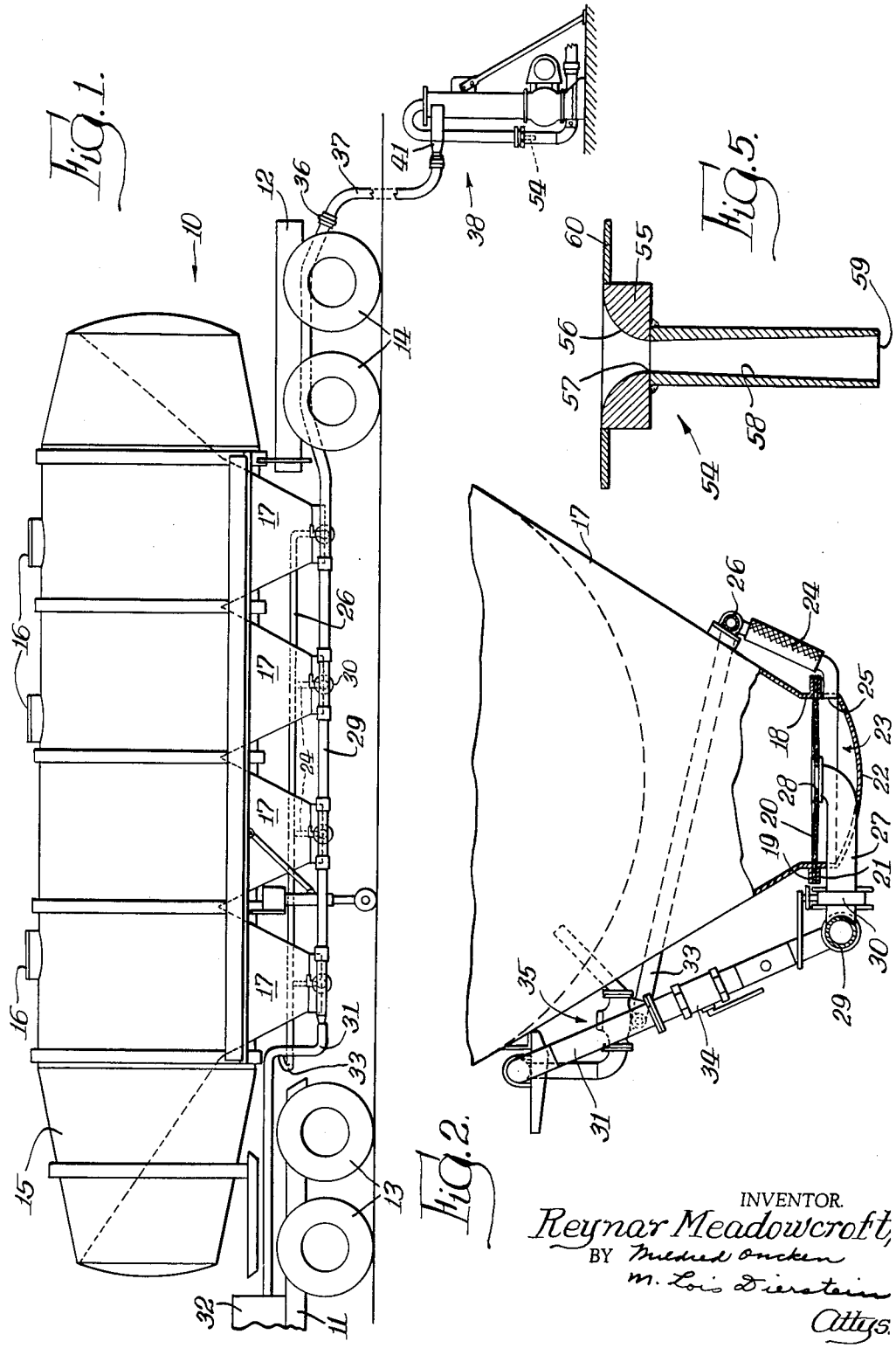
INVENTOR.
Reynar Meadowcroft,
BY Mildred Oncken
M. Lois Dierstein
Attys.

Nov. 30, 1965  R. MEADOWCROFT  3,220,779
METHOD AND APPARATUS FOR CONVEYING PARTICULATE MATERIAL
Filed April 24, 1963 2 Sheets-Sheet 2
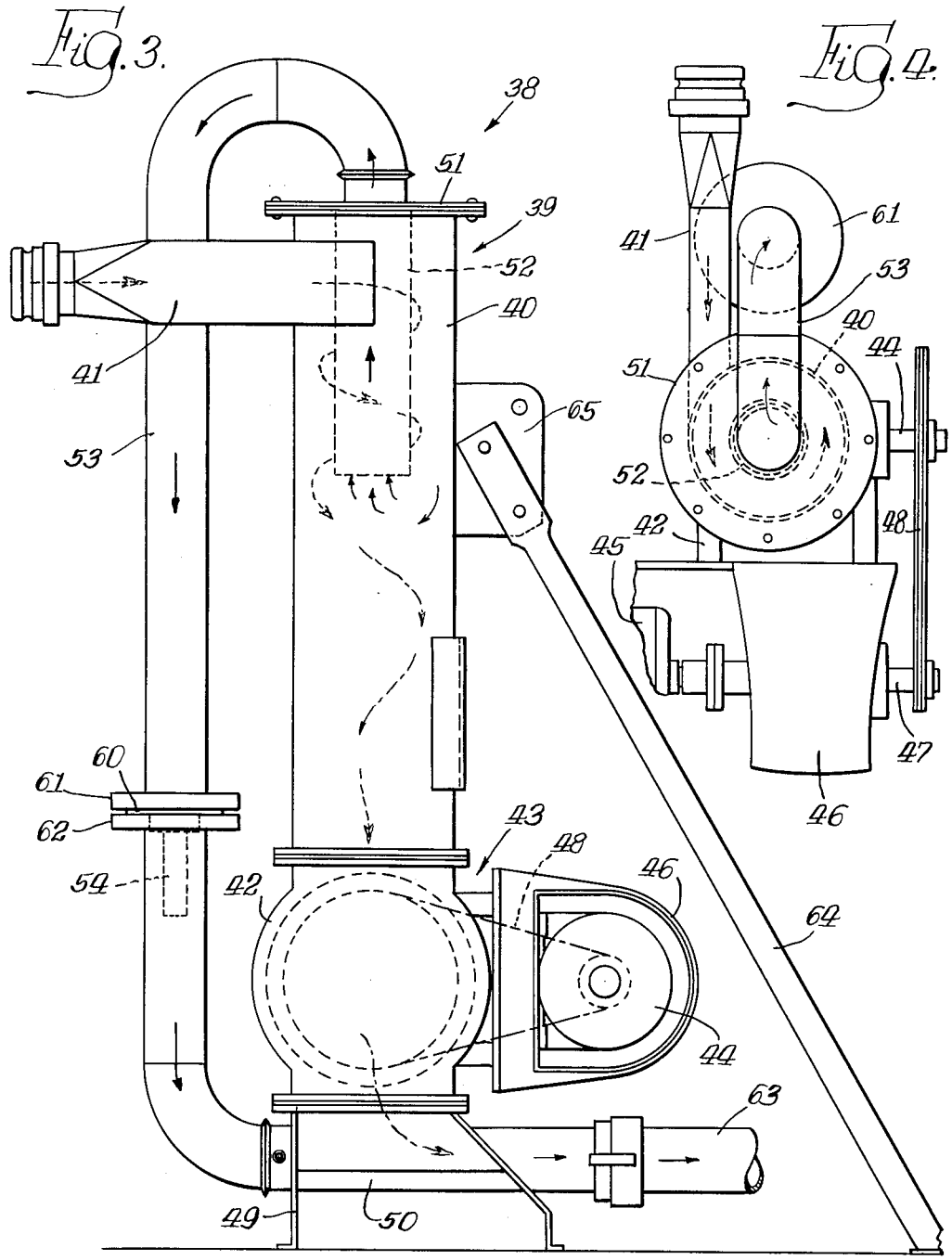
INVENTOR.
Reynar Meadowcroft

United States Patent Office 3,220,779
Patented Nov. 30, 1965

3,220,779
METHOD AND APPARATUS FOR CONVEYING PARTICULATE MATERIAL
Reynar Meadowcroft, Western Springs, Ill., assignor to Corn Products Company, New York, N.Y., a corporation of Delaware
Filed Apr. 24, 1963, Ser. No. 275,252
5 Claims. (Cl. 302—53)

My present invention relates generally to a method and apparatus for conveying particulate or pulverulent material, and more specifically to a method and apparatus for transferring a stream of gas borne particulate material from a closed supply chamber to a location of deposit.

At present, trucks or trailers with closed chambers or pressure vessels are used to transport particulate or pulverulent material such as dextrose crystals or flour, from one location to another. To effect delivery of the particulate material from the truck to a storage bin or tank located, for example, in a manufacturing or processing plant, air under pressure is introduced into the pressure vessel near the bottom thereof. This compressed air, which rises through the material into the free space above, loosens and aerates the material and creates a pressure within the vessel. When the pressure has risen to a predetermined amount, a portion of the compressed air is diverted into a delivery line which extends along the bottom of the pressure vessel and is connected by fixed piping, or flexible hose, or a combination of both, to the storage bin or tank. The particulate material is then introduced through outlets in the bottom of the pressure vessel into the delievry line and is conveyed therealong by the portion of compressed air being directed therethrough.

When the particulate material ceases to flow through the outlets in the vessel to the delivery line, either because the vessel has become emptied or because of the poor flow characteristics of the material, an unrestricted path exists between the pressure vessel and storage bin through which the compressed air rapidly escapes at a rate of flow that is several times greater than the normal rate of flow while material is being conveyed. This excessive quantity of air tends to pressurize the storage bin or tank in the manufacturing or processing plant to an extent that the safety valves frequently release resulting in a discharge of dust from the bin or tank into the plant generally. The ensuing undesirable consequences are obvious.

Several methods for meeting this problem have been adopted or proposed. Under one method a return line is connected from the in-plant storage tank to a cloth type dust collector mounted on the delivery truck. Although this procedure is often used to filter the normal conveying rate of air flow, it is impractical to provide a dust collector of sufficient size to handle the maximum rate of air flow when the particulate material is not flowing from the pressurized truck. Furthermore, this apparatus, which requires oversized return piping, is not only expensive but also difficult to manipulate in use. Another method contemplates the detection of an increase in pressure at the delivery end of the system coupled with a rapidly responding automatic device to restrict partially or completely the flow of air through the system. This solution is unsatisfactory in the case of most materials, and particularly in the case of those materials that lose their fluidizing suspending air rapidly, because a sudden restriction in the flow of air below the normal conveying quantity results in an instantaeous choke-up of the material in the system. Under a somewhat related method, detection of the absence of material at the discharge outlet of the pressure vessel accompanied by the closing of a valve in the air supply line has been proposed. Control devices of this type are difficult to keep operative in normal service and are unreliable.

It is an object of my present invention to provide a method and apparatus for transferring a stream of gas borne particulate material to a location of deposit wherein the rate of flow of gas will not exceed a predetermined maximum regardless of fluctuations in the ratio of material to gas in the stream.

It is another object of my present invention to provide a method and apparatus for transferring a stream of gas borne particulate material from a closed supply chamber to a location of deposit wherein the maximum rate of flow of gas is limited so that any increase in the rate of gas flow resulting from a decrease in the amount of particulate material present in the stream will not exceed a desirable level.

It is a further object of my present invention to provide a method and apparatus for transferring a stream of gas borne particulate material from a closed supply chamber to a location of deposit wherein the particulate material is separated from the stream of conveying gas, a restriction is placed on the rate of flow of the stream of gas from which the material has been separated, and the materials is reintroduced into the stream of gas for conveyance to the location of deposit.

It is a still further object of my present invention to provide a method and apparatus for transferring a stream of gas borne particulate material from a closed supply chamber to a location of deposit, as described, wherein the restriction or limitation on the rate of flow of the gas is accomplished by the use of a fixed device such as an orifice or nozzle.

In the accomplishment of the foregoing objects, I propose to introduce the gas borne particulate material into a device suitable for separating the material and gas. In the preferred embodiment of my present invention, the material and gas are separated in a centrifugal separator. The separated solid material is then transferred from the separator by a rotatable air lock feeder to a combining chamber. At the same time, the separated air is conducted from the separator through a duct to the combining chamber where the material is recombined with the gas for conveyance to the location of deposit. To limit the rate of flow of gas to a predetermined maximum, a restricting orifice or nozzle is connected in the duct that conducts the air from the separator to the combining chamber. In the preferred embodiment of my invention, the air lock feeder is driven at a substantially constant predetermined rate and the air flow restriction is an expanding nozzle. In accordance with the method and apparatus described, any increase in the rate of air flow at the point of discharge accompanying a decrease in the delivery of solids to the stream of conveying air is limited to an acceptable maximum amount. Thus, when my method and apparatus are used, for example, in connection with transferring particulate material from the pressure vessel of a truck to an in-plant storage bin or tank, there is no sudden excessive escape of air at the point of discharge when the particulate material flows in reduced quantities (or not at all) from the pressurized truck. Consequently, the storage bin or tank is not pressurized and the problems of possible discharge of dust into the plant is eliminated.

A still further object of my present invention is to provide a method and apparatus for transferring a stream of gas borne particulate material from a closed supply chamber to a location of deposit, as described, which is efficient and dependable in operation convenient to use, and inexpensive.

Now in order to acquaint those skilled in the art with the manner of constructing and using apparatus and methods in accordance with the principles of my present invention, I shall describe in connection with the accompanying drawings, a preferred embodiment of my invention.

In the drawings:

FIGURE 1 is a side elevational view of a trailer truck and of an embodiment of the conveying system of my present invention incorporated therewith, with portions being shown diagrammatically;

FIGURE 2 is a partial transverse elevational view of one of the discharge hoppers of the truck of FIGURE 1, with portions being broken away and shown in section and elevation;

FIGURE 3 is an enlarged side elevational view of the separator and recombining unit of the conveying system of FIGURE 1;

FIGURE 4 is a plan view of the separator and recombining unit of FIGURE 3, with the unit being revolved 90° about a vertical axis from the position shown in FIGURE 3; and FIGURE 5 is an enlarged vertical cross sectional view of the expanding nozzle embodied in the separator and recombining unit of FIGURE 3.

Referring now to FIGURE 1, there is indicated generally by the reference numeral 10 a mobile delivery unit in the form of a trailer truck having front and rear frame units 11 and 12 supported, respectively, on wheel assemblies 13 and 14. The frame units 11 and 12, in turn, support a pressure vessel 15 defining a chamber in which particulate or pulverulent material, such as dextrose crystals or flour, may be transported from one location to another. The pressure vessel 15 has inlet openings and associated covers 16 along the top side thereof through which particulate material may be introduced to fill the vessel. Depending from the underside of the vessel 15 are a plurality of integral discharge hoppers 17 arranged in longitudinal alignment.

The walls of each discharge hopper 17 converge in a downward direction and, as shown in FIGURE 2, terminate in a cylindrical mouth portion 18 having a radially outwardly directed annular flange portion 19. The mouth portion 18 is enclosed by a permeable sheet or pad 20 which is held in position about its periphery against the flange 19 by means of the annular flange portion 21 of a lower closure or cover member 22. Conventional means (not shown) are employed for securing the flanges 19 and 21 together. The sheet 20 and cover member 22 serve to define a plenum chamber 23.

A generally upwardly extending gas inlet conduit means 24 is secured at its lower end in an opening 25 formed in one wall of the cover 22 and is connected at its upper end to a horizontal gas conveying line 26. Gas, such as air under pressure, introduced into the plenum chamber 23 passes upwardly through the permeable sheet 20 and into the particulate material in the hopper 17 and vessel 15 thereabove. This flow or movement of air serves to stir up or aerate the particulate material. Those skilled in the art will recognize that other methods may be employed for introducing air into the particulate material. For example, a nozzle may be substituted for the plenum chamber 23. A generally horizontal outlet conduit 27, which extends through the wall of the cover member 22, is secured at its one end in a central opening 28 formed in the permeable sheet 20 and is connected at its other end to a horizontal discharge conduit 29. Interposed in the outlet conduit 27 is a gate valve 30, or other equivalent valve, which when opened permits a stream of particulate material and air to flow through the conduit 27 from the hopper 17 to the discharge conduit 29. Although the details of only one hopper 17 are shown and described, it is to be understood that each of the hoppers 17 is constructed and connected to the air conveying line 26 and discharge conduit 29 in an identical manner.

As shown in FIGURE 1, the air conveying line 26 and the discharge conduit 29 extend longitudinally of the pressure vessel 15 on opposite sides of the hoppers 17. The forward end of the discharge conduit 29 connects with a main air supply line 31, which may, for purposes of illustration, extend a short distance forwardly, then angularly upwardly and again forwardly to a blower or compressor 32 mounted on the front frame unit 11. The forward end of the air conveying line 26 also has connection with the main air supply line 31, for example, through a laterally inclined conduit 33 (FIGURE 2). Preferably, a valve 34 is inserted in the main air supply line 31 at a location intermediate of the connections of the conduits 29 and 33 with the supply line 31. A pressure relief valve assembly, indicated generally by the reference numeral 35, may also be inserted in the main air supply line 31 to prevent the pressure in the vessel 15 from exceeding a predetermined maximum. As shown in FIGURE 1, the rear end of the air conveying line 26 has a terminal connection with the rear hopper 17, while the rear end of the discharge conduit 29, which extends along the side of the rear frame unit 12, terminates in a coupling member 36. When unloading material from the vessel 15, air under pressure is directed from the blower 32 through the main air supply line 31, the conduit 33, the air conveying line 26 and the discharge conduit 29, in a manner and for a purpose to be described more fully hereinafter.

By means of the coupling 36, the discharge conduit 29 may be connected to the one end of a flexible hose 37 leading to a separator and recombining unit indicated generally at 38. The unit 38 may be maintained separate from the trailer truck 10 as shown in FIGURE 1, or may be mounted on the rear frame unit 12 adjacent the rear of the vessel 15. As shown in FIGURE 3, the unit 38 includes a centrifugal separator or cyclone 39 comprising a vertical cylindrical housing 40 defining a chamber wherein a stream of gas and particulate material may be separated and a horizontal inlet pipe 41 extending tangentially therefrom adjacent the upper end thereof. The outer end of the tangential inlet pipe 41 is adapted to be connected to the end of the flexible hose 37 opposite the end connected to coupling 36.

The separator housing 40 is supported on the housing 42 of a rotatable air lock feeder 43. A shown in FIGURE 4, a horizontal shaft 44 extends into the air lock feeder housing 42 and mounted thereon for rotation therewith within the housing 42 is a conventional rotor (not shown). Secured to the side of the housing 42 is a motor 45 and an interconnected speed reducer 46. The rotor shaft 44 is drivingly connected to the output shaft 47 of the speed reducer 46 by means of pulleys and an associated belt 48. The air lock feeder 43 serves to pass solids therethrough which are received from the separator housing 40, while sealing off the flow of gases from the lower end of the housing 40.

Support for the air lock feeder 43 is, in turn, provided by a base frame 49 (FIGURE 3). Suspended beneath the feeder 43 and extending through the base frame 49 is a horizontal conduit section 50 which serves to define a combining or mixing chamber. The conduit section 50 along its top side communicates with the air lock feeder 43 and receives any solids being passed therethrough. The upper end of the separator housing 40 is provided with a cover plate 51 having a central gas outlet opening therein from which depends a hollow cylinder 52. The upper end of the cylinder 52 is placed in communication with the left end of the conduit section 50, as viewed in FIGURE 3, by means of a gas flow line or duct 53 which may comprise a plurality of interconnected sections of tubing. By virtue of this arrangement, any gas flowing into the separator housing 40 is conveyed through the cylinder 52 and flow line 53 to the conduit section 50 where it is combined with any solids flowing from the air lock feeder 43.

To restrict or limit the rate of flow of air through the tubing 53 an orifice member 54, preferably in the form of an expanding nozzle, is disposed in the tubinng 53. As shown in FIGURE 5, the nozzle 54 has a body portion 55, a convergent entrance portion 56, a throat section 57, a divergent portion 58, an exit section 59, and an annular mounting ring 60. To obtain the maximum benefits of the method and apparatus of my present invention, I have found that the nozzle 54 should have an angle of divergence less than 10° and a ratio of length of divergence to throat diameter greater than five. More specifically, a nozzle that is satisfactory for use, for example, in 3¾-inch tubing may have one of the sets of dimensions (expressed in inches) set forth in the following table:

| Throat Diameter | Exit Diameter | Length of Divergence |
|---|---|---|
| .960 | 1.38 | 9.6 |
| .896 | 1.25 | 9.0 |
| .840 | 1.17 | 8.4 |

The nozzle 54 may be retained in position within the tubing 53 in any one of several ways known to those skilled in the art. By way of illustration, the tubing 53, as shown in FIGURE 3, may be fabricated in two sections connected together by means of a fitting comprising a pair of matching flanges 61 and 62. The nozzle 54 is held in position by clamping the annular mounting ring 60 between the flanges 61 and 62.

The right end of the conduit section 50, as viewed in FIGURE 3, is adapted to be connected to a flexible discharge hose, shown in part at 63, through which a stream of mixed gas and solids may be conducted to a location of deposit. To increase the stability of the separator and recombining unit 38 when the latter is maintained separate from the truck 10, an inclined brace 64 may, if desired, be arranged between a bracket 65 mounted on the side of the housing 40 and the supporting surface under the base frame 49.

I shall now describe the manner in which the method and apparatus of my present invention may be used to transfer particulate or pulverulent material from the pressure vessel 15 to a location of deposit such as a storage bin or the like. Assuming that material is contained in the vessel 15 and that the covers 16 are secured in a closed position, the valve 34 in the main air supply line 31 is closed and the blower or compressor 32 is activated. Air under pressure will flow through the main line 31, the lateral conduit 33, the air conveying line 26 and the inlet conduit means 24 to the plenum chambers 23 of the several hoppers 17. This air will then flow through the permeable sheets 20 and the material thereabove stirring up and aerating the material. Air passing through the material will eventually become trapped in the upper part of the chamber 15 thus creating a pressure therein. When such internal vessel pressure reaches a predetermined amount, the gate valves 30 and the air supply line valve 34 may be opened and the air lock feeder 43 activated. The valve 34 normally will be opened less than fully so that the flow of air from the compressor 32 will divide between the conduits 29 and 33. The extent of opening of the valve 30 may be varied to accommodate the flow characteristics of the aerated material. At this time, a stream of air and particulate material will flow through the outlet conduits 27 to the discharge conduit 29 and will be conveyed by the latter and the flexible hose 37 to the tangential inlet 41 of the separator and recombining unit 38.

The stream of mixed air and material separates upon entering the housing 40. The solid material under the force of gravity will fall toward the air lock feeder 43, while the air with a small unavoidable amount of entrained solids will pass upwardly through the hollow cylinder 52 and into the tubing 53. Solid material received by the feeder 43 from the housing 40 is passed therethrough and fed to the combining chamber 50. Preferably, the air lock feeder 43 is driven at a constant predetermined speed so that material is delivered substantially instantaneously to the combining chamber 50 at substantially the same rate at which the material enters the housing 40. As material is being fed to the combining chamber 50, air flows through the tubing 53 and into the chamber where the air and material are recombined and conveyed by the flexible delivery hose 63 to the location of deposit.

The previously described nozzle 54 in the tubing 53, which limits or restricts the rate of flow of air to a predetermined maximum amount for a given pressure within the vessel 15, serves to compensate for any decrease in resistance to air flow resulting from the decrease in the volume of solids delivered to the discharge conduit 29. Accordingly, I have provided a method and apparatus for transferring particulate material from a closed chamber, such as the pressure vessel of a truck, to a location of deposit, such as an in-plant storage bin or tank, which does not cause undesirable pressurization of the storage area.

While I have shown and described what I believe to be a preferred embodiment of the method and apparatus of my present invention, it will be understood by those skilled in the art that various rearrangements and modifications may be made therein without departing from the spirit and scope of my invention.

I claim:

1. In combination, a closed supply chamber for particulate material having an outlet at its lower end, means in the lower part of the chamber for introducing gas and stirring up the particulate material, the gas from said stirring means being trapped under pressure in the upper part of the chamber, a separator for separating gas from particulate material in a stream of gas borne particulate material, a conduit leading from said chamber outlet to said separator to conduct a stream of particulate material and gas from the chamber to the separator, a combining chamber, a gas outlet connection for conducting gas from the separator to said combining chamber, a connection between the lower end of the separator and the combining chamber for conducting said separated particulate material into the combining chamber, a delivery outlet for delivering a mixture of particulate material and gas from said combining chamber to a receiver, a gas flow restricting orifice of constant size in said gas outlet connection for limiting the rate of flow of gas through said connection to a predetermined maximum, and a gas locked mechanical feeder in said particulate material connection for delivering particulate material into said combining chamber to be picked up and carried by the flow of gas from said gas outlet connection through the combining chamber into the receiver, thereby avoiding a rapid surge of gas through said delivery outlet into the receiver upon diminution of the particulate material in the conduit leading to the separator from said supply chamber.

2. In a system for transferring loose finely divided material in bulk to a receiver, the combination of a supply pipe for conducting a moving current of said material conveyed in air in proportions of material to air which may change sharply, separating means for receiving said current and separating the material from the air, a combining chamber for receiving and combining a current of air and material delivered to it, a delivery duct from said combining chamber for delivering the mixture of air and material produced in said combining chamber to said receiver, an air conveying duct from the upper end of said separating means and said combining chamber, there being an air flow limiting restriction of constant size in said duct to limit the flow of air to substantially a predetermined maximum for a given supply pressure, and a material feeding passageway between the lower end of said separating means and said combining chamber, there being a rotatable feeder forming an air lock in said passageway for delivering material from said separating means to said combining chamber, whereby an increase in the rate of air flow through the delivery duct into the receiver resulting from a decrease in the amount of material being transferred in the stream is held to a maximum which is handleable by the receiver.

3. The combination of claim 2 wherein the flow restriction is an expanding nozzle which acts to limit flow of air therethrough to substantially a predetermined value.

4. The combination of claim 2 wherein the flow restriction is an expanding nozzle having an angle of divergence less than 10° and a ratio of length of divergence to throat diameter greater than five.

5. The combination of claim 2 with a closed pressure-retaining supply tank having an outlet connected to said supply pipe, means for supplying air under pressure to the interior of said tank, and means for delivering air and loose material through said outlet to the supply pipe, said delivery being at a ratio of air to material which is subject to substantial fluctuation.

References Cited by the Examiner
UNITED STATES PATENTS

| | | | |
|---|---|---|---|
| 2,439,721 | 4/1948 | Dickey | 302—35 |
| 2,622,341 | 12/1952 | Finnegan | 302—23 |
| 2,837,377 | 6/1958 | Finnegan | 302—23 |
| 2,924,489 | 2/1960 | Beckmann | 302—53 |

SAMUEL F. COLEMAN, *Primary Examiner.*